(12) United States Patent
Ren et al.

(10) Patent No.: US 6,911,260 B2
(45) Date of Patent: Jun. 28, 2005

(54) REINFORCED CARBON NANOTUBES

(75) Inventors: Zhifen Ren, Newton, MA (US); Jian Guo Wen, Newton, MA (US); Jing Y. Lao, Chestnut Hill, MA (US); Wenzhi Li, Brookline, MA (US)

(73) Assignee: Trustees of Boston College, Boston, MA (US)

( * ) Notice: Subject to any disclaimer, the term of this patent is extended or adjusted under 35 U.S.C. 154(b) by 85 days.

(21) Appl. No.: 10/339,849

(22) Filed: Jan. 10, 2003

(65) Prior Publication Data

US 2003/0157333 A1 Aug. 21, 2003

Related U.S. Application Data

(60) Provisional application No. 60/347,808, filed on Jan. 11, 2002.

(51) Int. Cl.[7] .................................................. B32B 9/00
(52) U.S. Cl. ........................ 428/408; 428/323; 428/364; 428/367; 428/368; 428/402; 428/698; 423/447.1; 423/439; 427/212; 427/249.1
(58) Field of Search ................................ 428/367, 376, 428/408, 359, 402, 698, 364, 368, 699, 323, 446; 423/447.1, 447.3, 447.2, 447.5, 346, 439; 427/212, 215, 249.1

(56) References Cited

U.S. PATENT DOCUMENTS 6,420,293 B1 * 7/2002 Chang et al. .............. 501/95.2

6,495,258 B1 * 12/2002 Chen et al. ................. 428/408
6,514,897 B1 * 2/2003 Moy et al. .................. 502/174

OTHER PUBLICATIONS

P.M. Ajayan and Sumio Iijima; "Capillarity–induced filling of carbon nanotubes"; (1993); *Nature*; 361: 333–334.
Oberlin, et al.; "Filamentous Growth of Carbon Through Benzene Decomposition"; (1976); *Journal of Crystal Growth*; 32: 335–349.
Copy of International Search Report dated Mar. 27, 2003.
Li, et al.; "Effect of gas pressure on the growth and structure of carbon nanotubes by chemical vapor deposition" *Appl. Phys. A*; (2001); 73: 259–264.
Li, et al.; "Large–Scale Synthesis of Aligned Carbon Nanotubes"; *Science*; (1996); 274: 1701–1703.

* cited by examiner

*Primary Examiner*—Deborah Jones
*Assistant Examiner*—Abraham Bahta
(74) *Attorney, Agent, or Firm*—Palmer & Dodge, LLP; Paula Campbell Evans

(57) ABSTRACT

The present invention relates generally to reinforced carbon nanotubes, and more particularly to reinforced carbon nanotubes having a plurality of microparticulate carbide or oxide materials formed substantially on the surface of such reinforced carbon nanotubes composite materials. In particular, the present invention provides reinforced carbon nanotubes (CNTs) having a plurality of boron carbide nanolumps formed substantially on a surface of the reinforced CNTs that provide a reinforcing effect on CNTs, enabling their use as effective reinforcing fillers for matrix materials to give high-strength composites. The present invention also provides methods for producing such carbide reinforced CNTs.

22 Claims, 14 Drawing Sheets

REINFORCED CARBON NANOTUBES

RELATED APPLICATIONS

This application claims the benefit of U.S. Provisional Application Ser. No. 60/347,808, filed on Jan. 11, 2002, which is hereby incorporated herein by reference in its entirety.

GOVERNMENT SUPPORT

The present invention was made with partial support from The US Army Natick Soldier Systems Center (DAAD, Grant Number 16-00-C-9227), Department of Energy (Grant Number DE-FG02-00ER45805) and The National Science Foundation (Grant Number DMR-9996289)

FIELD OF THE INVENTION

The present invention relates generally to reinforced carbon nanotubes, and more particularly to reinforced carbon nanotubes having a plurality of microparticulate carbide materials formed substantially on the surface of such reinforced carbon nanotubes composite materials.

BACKGROUND OF THE INVENTION

Reinforcing fillers are usually added to a matrix material to form high-strength composites. In order for the resulting composites to be useful, the reinforcing fillers must have a high load-bearing ability and binding affinity for the matrix. Carbon nanotubes (CNTs) have been added to matrix materials to form high-strength composites. However, the use of CNTs as reinforcing fillers, including multi-walled CNTs, has several disadvantages. Multi-walled CNTs have a tendency to pull out of, or slip from the matrix material, resulting in reduced load bearing ability. This is attributed to the fact that the interface between the matrix material and nanotube layers is very weak, thereby causing a "sword-in-sheath" type failure mechanism. Typically, only the outermost layer of multi-wall CNTs contributes to load bearing strength. (See, for example, D. Qian, et al. *Appl. Phys. Lett.,* 76, 2868 (2000) and C. Bower, et al. *Appl. Phys. Lett.,* 74, 3317 (1999)). Because of the weak van der Waals interaction between the CNTs cylindrical graphene sheets, improved bonding between carbon nanomaterials such as relatively "inert" CNTs and the matrix material is, therefore, essential for improved mechanical performance of the composite.

For high-strength CNT reinforced composites, the matrix material has to bind to the CNT reinforcing filler strongly (to prevent the two surfaces from slipping), so that an applied load (such as a tensile stress) can be transferred to the nanotubes. (See, for example, P. Calvert, *Nature,* 339, 210 (1999)). Several methods, including chemical functionalization of CNT tubule ends and side walls have been proposed and attempted to enhance bonding between CNTs and matrix material. (See, for example, J. Chen, et al. *Science,* 282, 95 (1998); A. Grag, et al. *Chem. Phys. Lett.,* 295, 273 (1998), and S. Delpeux, et al. *AIP Conf. Proc.,* 486, 470 (1999)). However, no significant improvement in mechanical properties has been observed after such modification. Chemical coating of both multi-wall and single-wall CNTs with metals and metallic oxides have also been reported for applications such as heterogeneous catalysis and one-dimensional nanoscale composites. (See, for example, T. W. Ebbesen, et al. *Adv. Mater.,* 8, 155 (1996), X. Chen, et al. *Compos. Sci. Technol.,* 60, 301 (2000), and L. M. Ang et al. *Carbon,* 38, 363 (2000)). The bonding between the coating materials and CNTs is, however, not strong enough to result in efficient load transfer. Thus, there exists a need in the art to improve the interaction between CNT reinforcing fillers and matrix materials in order to confer high mechanical strength to CNT reinforced composites and enable their commercial use in the manufacture of high-strength, lightweight mechanical and electrical device components.

SUMMARY OF THE INVENTION

The present invention provides CNTs comprising a plurality of microparticulate carbide or nitride material that provide a reinforcing effect on the CNT matrix, thereby conferring improved mechanical properties in the composite materials comprising them as reinforcing fillers. In particular, the present invention provides microparticulate carbide reinforced CNTs comprising boron carbide nanolumps formed on the surface of CNTs. The present invention also provides a method of producing microparticulate carbide reinforced CNTs. Specifically, the present invention provides the use of microparticulate carbide reinforced CNTs having boron carbide nanolumps formed on the surface of the CNTs to enable their use as reinforcing composite fillers in producing high strength composite materials.

The load transfer efficiency between a matrix material and multi-walled CNTs is increased when the inner layers of multi-walled CNTs are bonded to a matrix material. The present invention provides reinforced CNTs having boron carbide ($B_xC_y$) nanolumps formed substantially on the surface of the CNTs. The $B_xC_y$ nanolumps reinforce CNTs by bonding not only to the outermost layer, but also to the inner layers of the CNTs, and promote the bonding of matrix material to the inner layers of multi-walled CNTs. The load transfer efficiency also increases dramatically when the shape of the CNTs allows for a greater surface area along the CNTs and the matrix material. Boron carbides of the formula $B_xC_y$ are covalent bonding compounds with superior hardness, excellent mechanical, thermal and electrical properties. They are therefore excellent reinforcing material for CNTs. The carbide modified CNTs of the invention have superior mechanical properties as fillers for matrix materials, enabling the production of high-strength composites.

The present invention provides the synthesis of $B_xC_y$ nanolumps on the surface of multi-wall CNTs. In one embodiment, present invention uses a solid-state reaction between a boron source material and pre-formed CNTs to form boron carbide ($B_xC_y$) nanolumps on the surface of CNTs. In a preferred embodiment, the $B_xC_y$ nanolumps are formed by a solid-state reaction of magnesium diboride ($MgB_2$) and pre-formed CNTs. The $B_xC_y$ nanolumps are preferably bonded to the inner layers of multi-wall CNTs. In a preferred embodiment, the bonding between the $B_xC_y$ nanolumps and the CNTs is covalent chemical bonding. Typically, such covalent chemical nanolumps bonding between $B_xC_y$ and CNTs occurs in the absence of a secondary phase phase separation at the interface.

The present invention also provides methods of using reinforced CNTs having $B_xC_y$ nanolumps as reinforcing fillers in composites. The carbide reinforced CNTs of the invention can be used as additives to provide improved strength and reinforcement to plastics, ceramics, rubber, concrete, epoxies, and other materials, by utilizing of standard fiber reinforcement methods for improving material strength. Additionally, the carbide reinforced CNTs comprising $B_xC_y$ nanolumps are potentially useful for electronic applications, such as use in electrodes, batteries, energy storage cells, sensors, capacitors, light-emitting diodes, and electrochromic displays, and are also suited for other applications including hydrogen storage devices, electrochemical capacitors, lithium ion batteries, high efficiency fuel cells, semiconductors, nanoelectronic components and high strength composite materials. Furthermore, the methods of the present invention provide large scale, cost efficient synthetic processes for producing linear and branched carbide reinforced CNTs having $B_xC_y$ nanolumps.

The carbide-reinforced CNTs of the present invention have several advantages over current reinforcing materials known in the art. CNTs are reinforcing filler for composites because of their very high aspect ratio, large Young's modulus, and low density. Carbide reinforced CNTs of the invention containing $B_xC_y$ nanolumps are superior reinforcing fillers for incorporation within a matrix material because the modification of carbon nanotube morphology by the $B_xC_y$ nanolumps increases the load transfer efficiency between CNTs and the matrix material. The shape modification of CNTs by $B_xC_y$ nanolumps provides a greater CNT surface area that results in stronger adhesion of the matrix material, while nanolump bonding to the inner layers of multi-wall CNTs allows for a greater load transfer from matrix materials to CNTs. Although the carbide reinforced CNT materials of the invention are illustrated with boron carbide ($B_xC_y$) as the reinforcing material, it ill be understood by one skilled in the art that other metallic and non-metallic carbides, metallic and non-metallic nitrides may be substituted for boron carbide without departing from the scope of the invention. Metallic carbides, such as boron carbides, are among the hardest solids known in the art, along with diamond and boron nitride. $B_xC_y$ has a high melting point, high modulus, low density, large neutron capture section, superior thermal and electrical properties, and is chemically inert.

The foregoing and other aspects, features and advantages of the present invention will become apparent from the figures, description of the drawings and detailed description of particular embodiments.

BRIEF DESCRIPTION OF THE DRAWINGS

The present invention will be further explained with reference to the attached drawings, wherein like structures are referred to by like numerals throughout the several views. The drawings shown are not necessarily to scale, with emphasis instead generally being placed upon illustrating the principles of the present invention.

FIG. 1(a) shows multi-wall CNTs before the formation of $B_xC_y$ nanolumps. FIG. 1(b) shows multi-wall CNTs after the formation of $B_xC_y$ nanolumps.

FIG. 2(a) shows a multi-wall CNT at low magnification. FIG. 2(b) shows a multi-wall CNT at medium magnification.

FIG. 3(a) shows a high-resolution transmission electron microscope (HRTEM) image of a $B_xC_y$ nanolump on a multi-wall carbon nanotube. FIG. 3(b) shows an enlarged image of the upper portion of FIG. 3(a). FIG. 3(c) shows a fast-Fourier transformation (FFT) image of FIG. 3(b). FIG. 3(d) shows the twin boundaries along (101) or (01$\bar{1}$) planes of $B_xC_y$.

FIG. 4(a) shows the reacted area of a multi-wall carbon nanotube. FIG. 4(b) shows the interface between $B_xC_y$ nanolumps and a carbon nanotube is sharp and well bonded. FIG. 4(c) shows an epitaxial relationship between $B_xC_y$ nanolump and a multi-wall carbon nanotube with a (101) plane perpendicular to the zigzag-type nanotube axis.

FIG. 6(a) shows CNTs grown at a gas pressure of 0.6 torr. FIG. 6(b) shows CNTs grown at a gas pressure of 50 torr. FIG. 6(c) shows CNTs grown at a gas pressure of 200 torr. FIG. 6(d) shows CNTs grown at a gas pressure of 400 torr. FIG. 6(e) shows CNTs grown at a gas pressure of 600 torr. FIG. 6(f) shows CNTs grown at a gas pressure of 760 torr.

FIG. 7(a) shows CNTs grown at a gas pressure of 0.6 torr. FIG. 7(b) shows CNTs grown at a gas pressure of 200 torr. FIG. 7(c) shows CNTs grown at a gas pressure of 400 torr. FIG. 7(d) shows CNTs grown at a gas pressure of 760 torr.

FIG. 8(a) shows symmetrically branched (Y-shaped) CNTs at low magnification (scale bar=1 $\mu$m). FIG. 8(b) shows symmetrically branched (Y-shaped) CNTs at high magnification (scale bar=200 nm).

FIG. 9(a) shows branched CNT Y-junctions with straight hollow arms and uniform diameter (scale bar=100 nm). FIG. 9(b) shows branched CNT Y-junctions with a pear-shaped particle cap at tubule terminal (scale bar=100 nm) (expanded in bottom inset) and XDS photomicrograph (top right inset) showing composition of particle. FIG. 9(c) shows branched CNT Y-junctions shows a branched CNT with a double Y-junction (scale bar=100 nm) (open tubule shown in inset). FIG. 9(d) shows branched CNT Y-junctions shows a high resolution partial image of a well graphitized, hollow tubule Y-junction.

FIG. 10(a) shows CNTs grown at a gas pressure of 0.6 torr. FIG. 10(b) shows CNTs grown at a gas pressure of 50 torr. FIG. 10(c) shows CNTs grown at a gas pressure of 200 torr. FIG. 10(d) shows CNTs grown at a gas pressure of 400 torr. FIG. 10(e) shows CNTs grown at a gas pressure of 600 torr. FIG. 10(f) shows CNTs grown at a gas pressure of 760 torr.

FIG. 11(a) shows CNTs synthesized at 800° C. FIG. 11(b) shows CNTs synthesized at 950° C. FIG. 11(c) shows CNTs synthesized at 1050° C. FIG. 11(d) shows CNT yield dependence on reaction temperature.

FIG. 12(a) shows "bamboo-like" CNTs synthesized at 650° C. FIG. 12(b) shows "bamboo-like" CNTs synthesized at 800° C. FIG. 12(c) shows "bamboo-like" CNTs synthesized at 1050° C.

Figure 1:
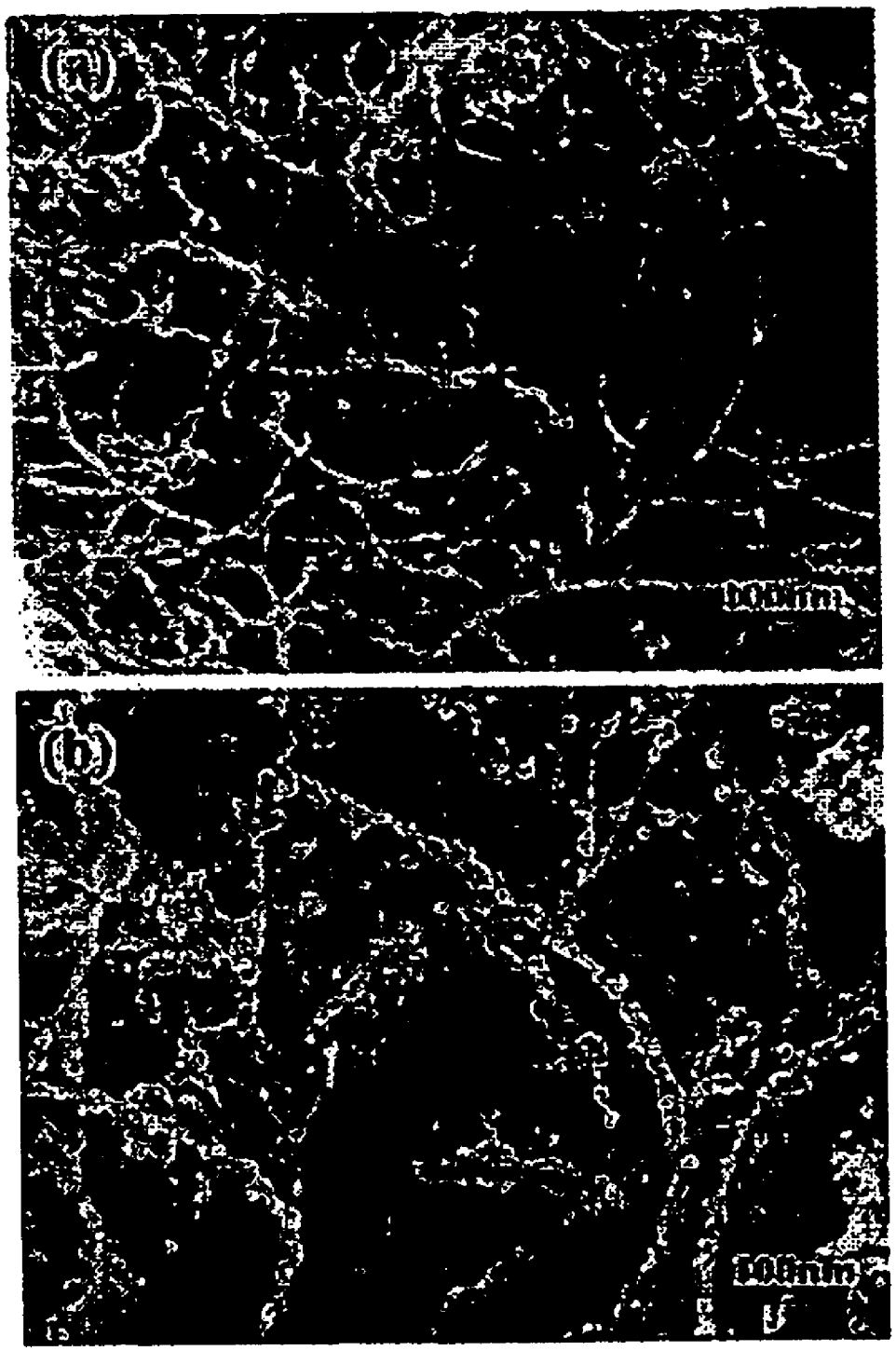
FIG. 1 shows scanning electron microscope (SEM) images of multi-wall CNTs.

While the above-identified drawings set forth preferred embodiments of the present invention, other embodiments of the present invention are also contemplated, as noted in the discussion. This disclosure presents illustrative embodiments of the present invention by way of representation and not limitation. Numerous other modifications and embodiments can be devised by those skilled in the art which fall within the scope and spirit of the principles of the present invention.

DETAILED DESCRIPTION OF THE INVENTION

The present invention provides CNTs comprising a plurality of microparticulate carbide materials that exist substantially on the CNT surface and function as effective reinforcing agents. Specifically, the present invention provides reinforced CNTs having a plurality of microparticulate carbide nanolumps formed in situ on the surface of the CNTs. The present invention also provides a method of producing reinforced CNTs having $B_xC_y$ nanolumps formed on the surface of the CNTs. The present invention also provides a method of using reinforced CNTs having $B_xC_y$ nanolumps formed on the surface of the CNTs as reinforcing composite fillers.

The terms "boron carbide nanolump" and "$B_xC_y$ nanolump" refer to a nanoscale aggregate comprising a boron carbide microparticles on a surface of a nanoscale carbon material, including but not, limited to carbon nanotubes. Nanolumps are typically irregular in shape.

The term "reinforced carbon nanotube" refer to strengthened CNTs in which more force or effectiveness is given to the carbon nanotube. In one embodiment of the present invention, CNTs are reinforced by reducing the amount that the inner layers of a multi-walled CNT slip from the outer layers of the CNT. In a currently preferred embodiment, CNTs are reinforced by bonding a microparticulate carbide material substantially to the surface of the CNT which binds to the inner walls of the CNTs.

The term "matrix material" refers to any material capable of forming a composite with reinforced CNTs. Examples of matrix materials include, but are not limited to, plastics, ceramics, metals, metal alloys, rubber, concrete, epoxies, glasses, polymers, graphite, and mixtures thereof. A variety of polymers, including thermoplastics and resins, can be used to form composites with the reinforced CNT's of the present invention. Such polymers include, but are not limited to, polyamides, polyesters, polyethers, polyphenylenes, polysulfones, polycarbonates, polyacrylites, polyurethanes or epoxy resins.

The term "carbide forming source" refers to any suitable material capable of forming a carbide material. The carbide forming source can be metallic or non-metallic. Preferred carbide forming source include, but are not limited to, magnesium diboride ($MgB_2$), aluminum diboride ($AlB_2$), calcium diboride ($CaB_2$), and gallium diboride ($GaB_2$). Preferably the carbide forming source exists in the form of a carbide forming source powder.

A "carbide material" as referred to herein is afforded the meaning typically provided for in the art. More specifically, a carbide material is a binary solid compound of carbon an another element. Element capable of forming carbide materials can be metallic or non-metallic. Examples of element that can form carbides include, but are not limited to, boron (B), calcium (Ca), tungsten (W), silicon (Si), nobium (No), titanium (Ti), and iron (Fe). Carbides can have various ratios between carbon and the element capable of forming carbide material. A presently preferred carbide material of the present invention is boron carbide ($B_xC_y$). A presently preferred carbide material of the present invention is boron carbide ($B_xC_y$).

The carbide materials on the surface of CNTs can be either in the form of a contiguous coating layer or a non-contiguous surface layer, such as, for example, in the form of nanolumps. In a preferred embodiment, the carbide material is $B_xC_y$ in a non-contiguous surface layer in the form of nanolumps. In one embodiment, the interface between $B_xC_y$ nanolumps and CNTs is sharp, in which there is no amorphous layer in between the $B_xC_y$ nanolumps and CNTs. The $B_xC_y$ nanolumps may be chemically bound to the CNT surface by covalent bonding or by van der Waals type attractive forces. Preferably, the $B_xC_y$ nanolumps are bound to CNTs covalently.

The $B_xC_y$ nanolumps of the present invention typically have an average particle size from about 10 nanometers (nm) to about 200 nm. Preferably, the $B_xC_y$ nanolumps have an average diameter of about two to three times the average diameter of CNTs. In one embodiment, the $B_xC_y$ nanolumps have an average diameter ranging from about 50 nm to about 100 nm. In a preferred embodiment, the $B_xC_y$ nanolumps have an average diameter of about 80 nm.

The $B_xC_y$ lump density on the reinforced CNTs of the invention can vary over a wide range. Preferably, the nanolumps are isolated nanolumps. The spacing variation between adjacent nanolumps on a CNT can range from about 30 nm to about 500 nm and is dependent on the particle density on the CNT surface, which is expressed as a ratio of the percentage of boron atoms to carbon atoms in the boron carbide $B_xC_y$ (atom % carbon). In a preferred embodiment, the spacing between $B_xC_y$ nanolumps is from about 50 nm to about 100 nm.

The $B_xC_y$ nanolumps in the reinforced CNTs of the present invention can be crystalline or amorphous. In a preferred embodiment, the $B_xC_y$ nanolumps are crystalline. The crystal geometries of the $B_xC_y$ nanolumps include, but are not limited to, rhombohedral, tetragonal and orthorhombic. In a preferred embodiment, the crystal structure of the $B_xC_y$ nanolumps is rhombohedral.

The ratio of boron to carbon in the $B_xC_y$ nanolumps is variable. Boron carbides typically exists as stable single phase, with a homogeneity ranging from about 8 atom % carbon to about 20 atom % carbon. Examples of boron carbon ratios within this range are $B_4C$ and $B_{10}C$. The boron carbide nanolumps in the reinforced CNTs of the invention have the general formulas $B_xC_y$ wherein x ranges from 4–50 and y ranges form 1–4. The most stable $B_xC_y$ structures are rhombohedral with a stoichiometry of $B_{13}C$, $B_{12}C_3$ or $B_4C$, tetragonal with a stoichiometry of $B_{50}C_2$, $B_{50}C$, $B_{48}C_3$, $B_{51}C$, $B_{49}C_3$, or orthorhombic with a stoichiometry of $B_8C$. Other stable $B_xC_y$ structures include $B_{12}C$, $B_{12}C_2$ and $B_{11}C_4$. In one embodiment, the ratio of boron to carbon is 4 boron atoms to one carbon atom ($B_4C$).

Typically, twin boundaries can be observed in $B_4C$ nanolumps. In one embodiment, the twin boundary is along either (101) or (01$\bar{1}$) planes, as shown in FIG. 3(d).

Figure 3:
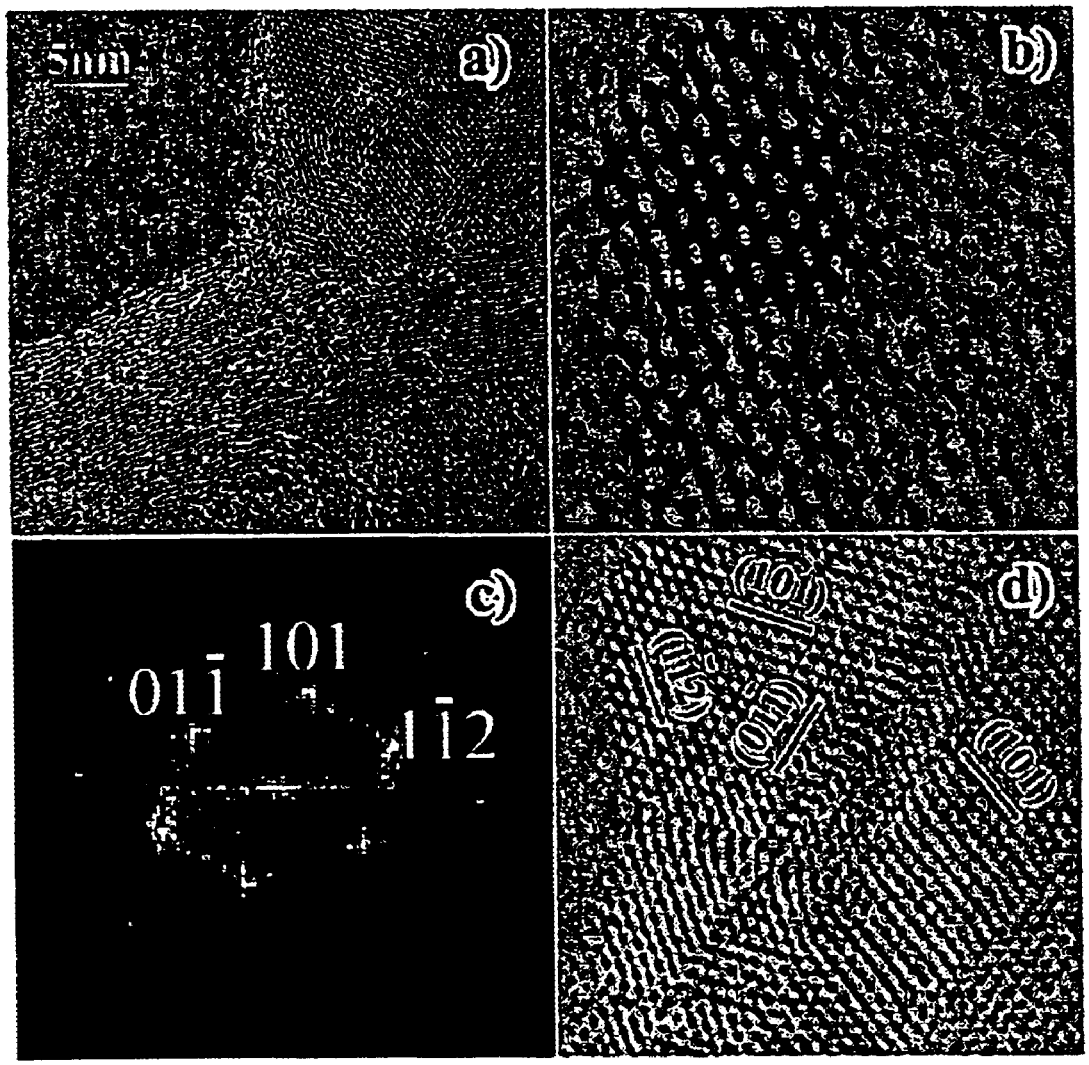
FIG. 3 shows images of $B_xC_y$ nanolumps on a multi-wall CNT.

FIG. 3 shows images of $B_xC_y$ nanolumps on a multi-wall CNTs. FIG. 3(a) shows an HRTEM image of a $B_xC_y$ nanolump on a multi-wall carbon nanotube. FIG. 3(b) shows an enlarged image of the upper portion of FIG. 3(a). FIG. 3(c) shows a FFT image of FIG. 3(b). The simulated image, as shown in the inset of FIG. 3(b), and the indexing of the FFT image, as shown in FIG. 3(c), were carried out by using structural parameters of $B_xC_y$ and zone axis of ($\bar{1}$11). FIG.

3(d) shows the twin boundaries along (101) or (01$\bar{1}$) planes of $B_xC_y$. The main parameters for the simulated image, as shown in the inset of FIG. 3(b), are: spherical aberration coefficient=0.5 mm, thickness=10 nm, and defocus=50 nm.

$B_xC_y$ nanolumps of the invention provide materials such as carbon fibers and CNTs with a knotted-rope-shaped or bone-shaped morphology. Knotted-rope-shaped CNTs and bone-shaped CNTs can be excellent reinforcing fillers to increase strength and toughness due to a more effective load transfer between CNTs and matrix materials. The lumps or knots allow for mechanical matrix-CNT interlocking.

Another aspect of the present invention is a method of producing CNTs having boron carbide ($B_xC_y$) nanolumps formed on the surface of the CNTs. The method of the present invention can be applied to CNTs comprising any morphology including aligned or non-aligned linear arrays. Preferably, the CNTs have a branched, multi-walled morphology.

The term "carbide forming source" refers to metallic or non-metallic material, known in the art, capable of forming a carbide in-situ on the CNT surface. Examples of a carbide forming source include, but are not limited to, Magnesium diboride (Mg $B_2$), aluminum diboride (AlB$_2$), calcium diboride (CaB$_2$) and gallium diboride (GaB$_2$). A preferred carbide forming source is Magnesium diboride (Mg B$_2$).

$B_xC_y$ nanolumps can be grown on CNTs using any suitable method. In one embodiment, $B_xC_y$ nanolumps are grown on CNTs by using a solid state reaction between a boron source and CNTs. Any suitable boron source known in the art can be used. Suitable boron sources include, but are not limited to, magnesium diboride (MgB$_2$) and aluminum diboride (AlB$_2$). In a preferred embodiment, the boron source is MgB$_2$. Preferably, the boron source is in the form of a powder. In one embodiment, the powder comprises particles with an average grain size of about 0.1 micrometer ($\mu$m) to about 100 micrometers ($\mu$m). Preferably, the powder comprises particles with an average grain size of about 1 micrometer. The synthesis of magnesium diboride (MgB$_2$) powders is accomplished by combining elemental magnesium and isotopicaly pure boron by known methods.

The boron source used in the present invention decomposes at a temperature of between about 100° C. to about 1000° C., preferably, at a temperature of about 600° C. Thermally decomposed boron is typically more reactive chemically; the solid-state reaction can, therefore, be performed at relatively low temperatures. In one embodiment, the solid state reaction is performed at temperatures ranging from about 500° C. to about 2000° C. In a preferred embodiment, the solid state reaction is performed at temperature of ranging from about 1000° C. to about 1250° C.

The CNTs used for producing reinforced CNTs of the present invention are purified by any suitable method known in the art prior to introduction of $B_xC_y$ nanolumps. In one embodiment, CNTs are purified by washing with a mineral acid. Examples of suitable mineral acids include, but are not limited to, hydrofluoric acid (HF), hydrochloric acid (HCl), hydrobromic acid (HBr), hydroiodic acid (HI), sulfuric acid (H$_2$SO$_4$) or nitric acid (HNO$_3$). In a preferred embodiment, the mineral acid is HCl and HNO$_3$.

The purified CNTs nanotubes are then be mixed with the boron source powder. Gentle mechanical mixing following which the mixture is wrapped with a metal foil to form an assembly. Preferred metal foils include, but are not limited to, transition metal foils. In a currently preferred embodiment, the metal foil is Tantalum (Ta). The assembly is then placed in a ceramic tube furnace, in a vacuum of about 0.5 torr by mechanical pump. In one embodiment, the reaction area is localized only at the area where boron is present. That is, no surface diffusion of boron is observed in the solid-state reaction.

Alternate methods for the formation of $B_xC_y$ nanolumps such as chemical vapor deposition (CVD) can be used. In one embodiment of the present invention, CVD of boron carbide such as plasma enhanced chemical vapor deposition (PECVD), hot filament chemical vapor deposition (HFCVD), and synchrotron radiation chemical vapor deposition (SRCVD) using reactive gas mixtures such as BCl$_3$—CH$_4$—H$_2$, B$_2$H$_6$—CH$_4$—H$_2$, B$_5$H$_9$—CH$_4$, BBr$_3$—CH$_4$—H$_2$, C$_2$B$_{10}$H$_{12}$, BCl$_3$—C$_7$H$_8$—H$_2$, B(CH$_3$)$_3$ and B(C$_2$H$_5$)$_3$ are used. One embodiment, of the present invention uses a solid state reaction between a carbide forming source and CNTs. Another embodiment, of the present invention uses a solid state reaction between a boron source and CNTs.

The present invention provides a method of manufacturing reinforced carbon nanotubes having a plurality of boron carbide nanolumps formed substantially on a surface of pre-formed CNTs comprising the steps of: (1) purifying a plurality of carbon nanotubes by washing with a mineral acid; (2) mixing the plurality of carbon nanotubes with a boron source powder to form a mixture of carbon nanotubes and boron source powder; (3) wrapping the mixture of carbon nanotubes and boron source powder within a metal foil; (4) placing the metal foil containing the mixture of carbon nanotubes and boron source powder in a ceramic tube furnace; (5) pumping the ceramic tube furnace to below about 0.5 torr by a mechanical pump; and (6) heating the ceramic tube furnace.

In one aspect of the present invention, a material comprising a plurality of reinforced carbon nanotubes having a plurality of boron carbide nanolumps formed substantially on the surface of the CNTs is used as reinforcing fillers for materials comprising the step of combining the plurality of reinforced carbon nanotubes and a matrix material to form a high-strength composite.

FIG. 1(a) shows a SEM image of the CNTs before the growth of boron carbide nanolumps. FIG. 1(b) shows a SEM image of $B_xC_y$ nanolumps on the surface of multi-wall carbon nanotubes. The $B_xC_y$ nanolumps form into a desired morphology, individual nanoparticles instead of a homogeneous layer on the surface of multi-wall carbon nanotubes. The average particle size of the $B_xC_y$ nanolumps is about 80 nm in diameter, which is two or three times of the average diameter of CNTs. The lump density on a carbon nanotube varies dramatically, with a spacing variation between adjacent nanolumps from about 30 nm to about 500 nm.

Figure 2:
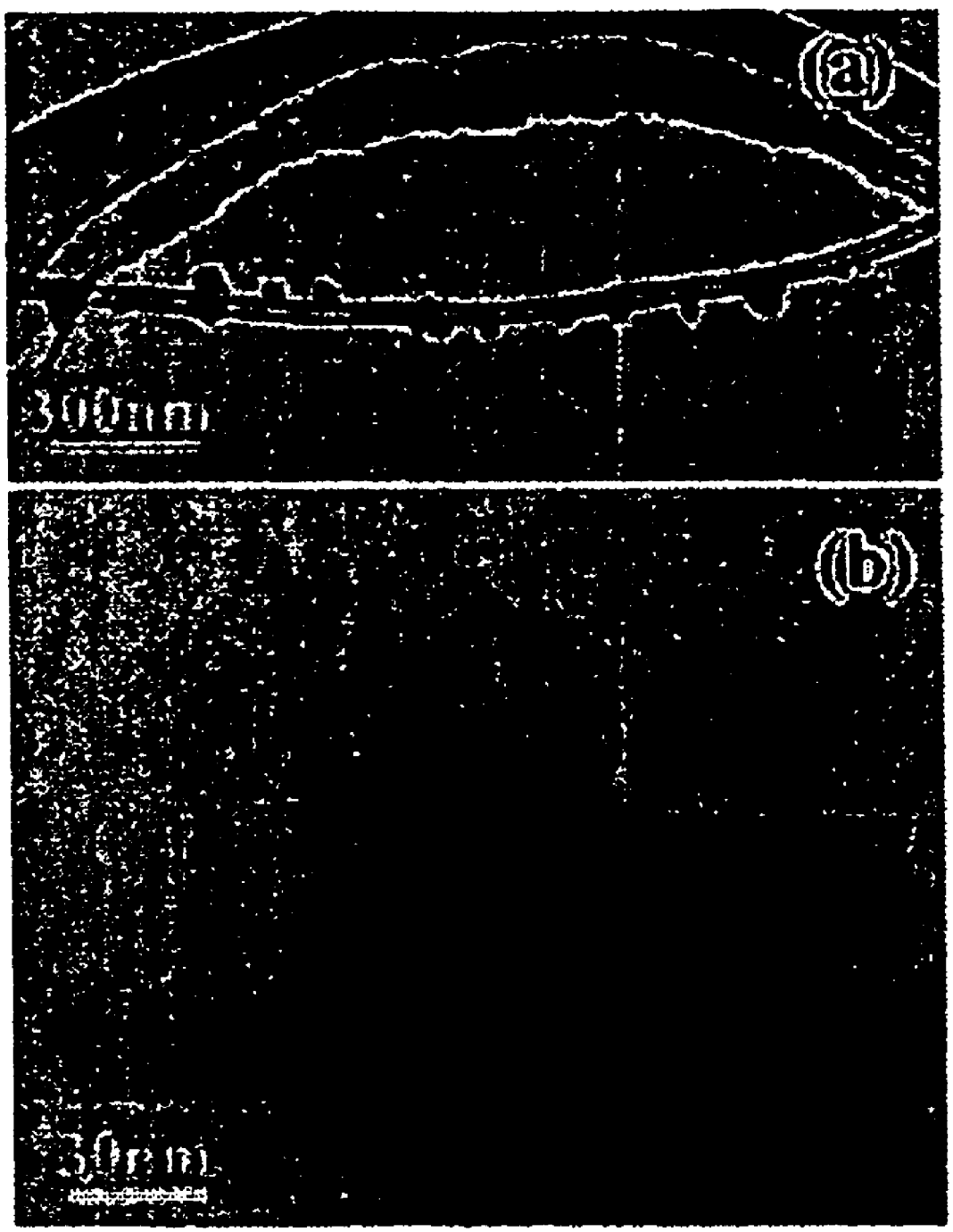
FIG. 2 shows transmission electron microscope (TEM) images of a multi-wall CNT with $B_xC_y$ nanolumps.

FIG. 2(a) and FIG. 2(b) show TEM images of $B_xC_y$ nanolumps on multi-wall CNTs at low and medium magnifications, respectively. The average particle size shown in FIG. 2(a) is about 50 nm, smaller than that shown in FIG. 2(b). As shown in FIG. 2(a) and FIG. 2(b), the reaction between boron and CNTs is confined and the main structure of multi-wall CNTs remains unchanged. X-ray energy dispersive spectrometer (EDS) analysis on the composition of the nanolumps shows that the nanolumps contain only carbon. No magnesium (Mg) or Boron (B) were detected. The Mg from the decomposition of magnesium diboride (MgB$_2$) becomes vapor at the reaction temperature of about 1100° C. to about 1150° C. and was pumped out. But the existence of boron can not be excluded because boron can not be detected by the EDS system, since the low energy x-rays from boron atoms were absorbed by detector.

Figure 4:
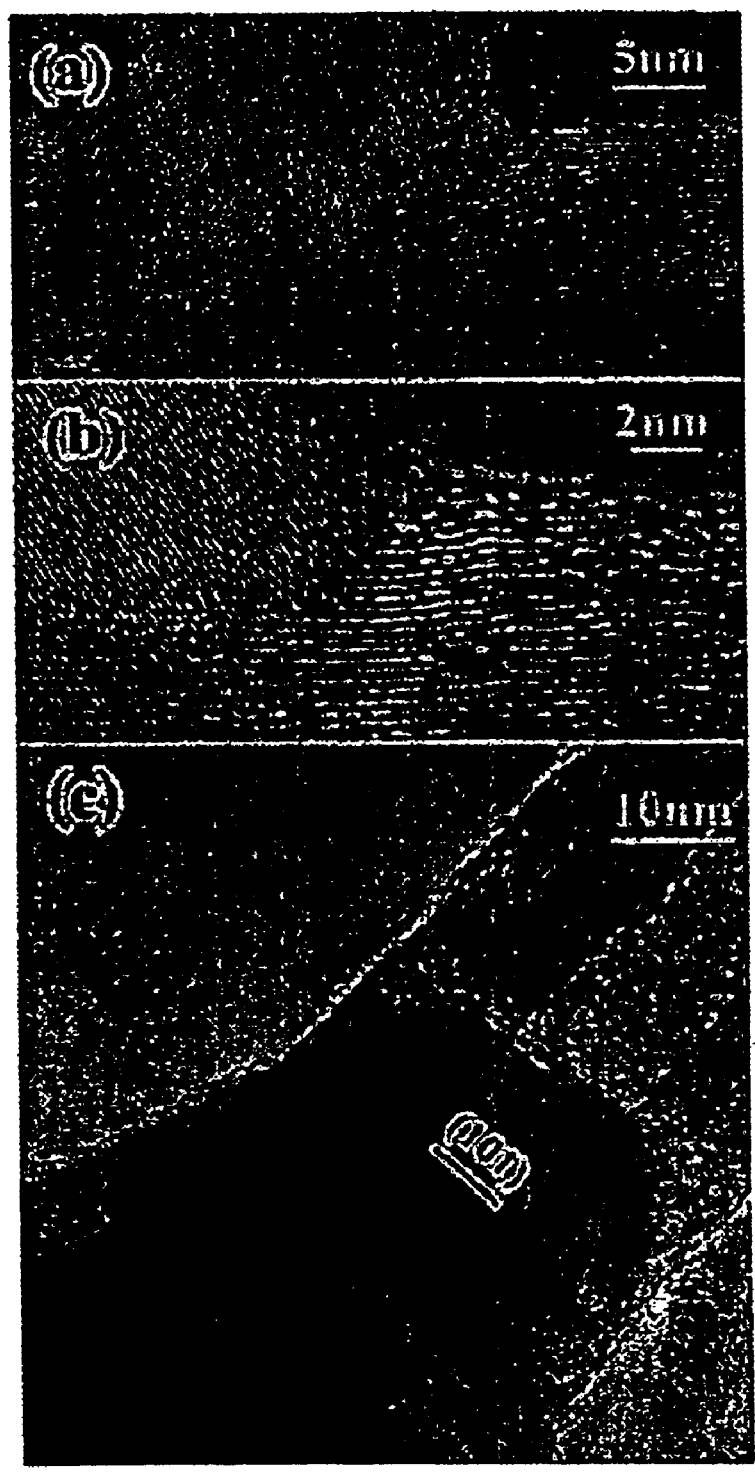
FIG. 4 shows high-resolution transmission electron microscope (HRTEM) images.

FIG. 4(a) shows an interface between $B_xC_y$ nanolump and multi-wall carbon nanotube. Part of multi-wall CNTs is reacted with boron by a solid state reaction, therefore no lattice fringes of CNTs can be observed at the bottom portion of the $B_xC_y$ nanolump. The solid state reaction area is localized only at the area where there is boron. No surface diffusion of boron is observed in the solid-state reaction. As shown by the HRTEM images of FIG. 4(a) and FIG. 4(b), the interface between $B_xC_y$ nanolumps and CNTs is sharp. No amorphous layer was found at the interface between $B_xC_y$ nanolumps and CNTs. An epitaxial relationship between CNTs and $B_xC_y$ nanolumps is shown in FIG. 4(c) and supports the conclusion of strong interface between $B_xC_y$ nanolumps and CNTs. Inner layers of CNTs at the reaction area are also bonded to $B_xC_y$ as shown in FIG. 4(a) and FIG. 4(b). The bonding between $B_xC_y$ nanolumps and CNTs is strong, most likely, a covalent bonding, because the bonding between boron atoms and carbon atoms inside $B_xC_y$ is covalent.

The strong bonding at the interface between $B_xC_y$ nanolumps and CNTs can prevent the breaking at the interface between $B_xC_y$ nanolumps and CNTs during load transfer. Bone-shaped short fibers were reported to be ideal reinforcing fillers to increase strength and toughness due to a more effective load transfer. Therefore, the modification of CNT morphology by $B_xC_y$ nanolumps increases the load transfer between nanotubes and matrix. Moreover, inner layers of multi-wall CNTs are also bonded to $B_xC_y$ nanolumps, so the inner layers can also contribute to load carrying, instead of only the outmost layer.

Reinforced CNTs can be used to form or reinforce composites with other materials, especially a dissimilar material. Suitable dissimilar materials include, but are not limited to, metals, ceramics, glasses, polymers, graphite, and mixtures thereof. Such composites may be prepared, for example, by coating the reinforced CNTs with the dissimilar material either in a solid particulate form or in a liquid form. A variety of polymers, which include but are not limited to, thermoplastics and resins can be utilized to form composites with the products of the present invention. Such polymers include, but are not limited to, polyamides, polyesters, polyethers, polyphenylenes, polysulfones, polyurethanes or epoxy resins. Branched CNTs of the present invention can find application in construction of nanoelectronic devices and in fiber-reinforced composites. The Y-junction CNT fibers of the invention are expected to provide superior reinforcement to composites compared to linear CNTs.

The carbon nanotubes comprised in the reinforced CNTs of the present invention can possess any of the several known morphologies. Examples of known CNT morphologies include, but are not limited to, linear, non-linear, branched, "bamboo-like", and non-linear ("spaghetti-shaped"). Individual tubules of such CNTs can be either single or multi-walled. CNTs with the above morphologies are described, for example, in Li, et al., *Appl. Phys. A: Mater. Sci. Process*, 73, 259 (2001) and U.S. application Ser. No. 10/151,382, filed on May 20, 2002. Both references are hereby incorporated herein by reference in their entirety. In a currently preferred embodiment, the reinforced CNTs of the invention have a branched, multi-walled tubule morphology.

Figure 5:
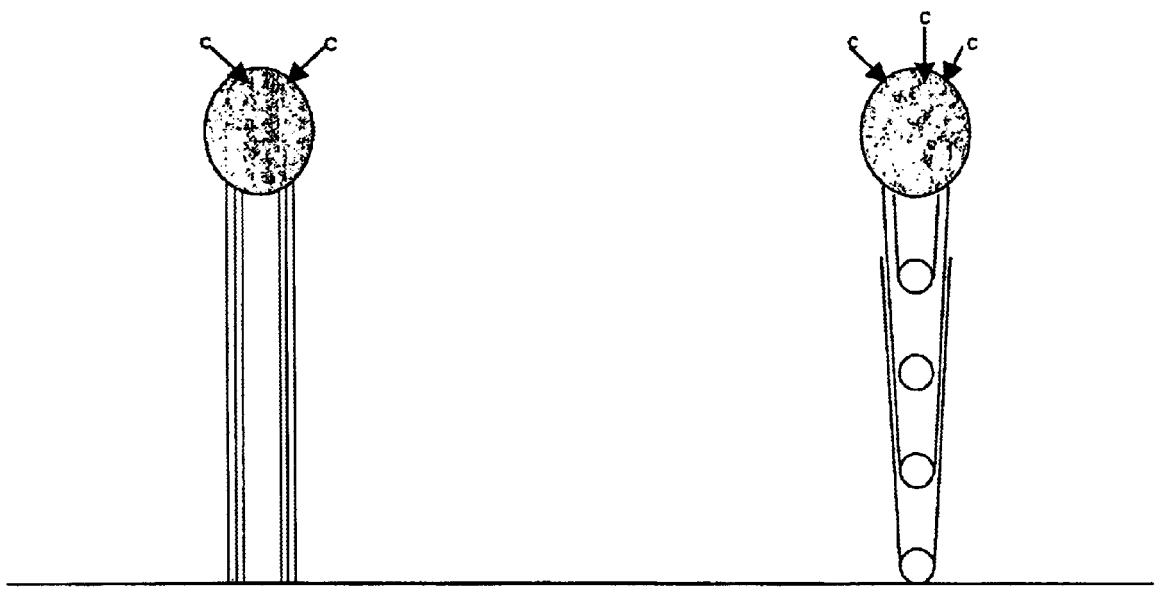
FIG. 5 is a schematic drawing illustrating carbon nanotube (CNT) morphologies.

The CNTs in the carbide reinforced CNT materials of the present invention can be aligned or non-aligned. Preferably, the CNTs are non-aligned, substantially linear, concentric tubules with hollow cores, or capped conical tubules stacked in a bamboo-like arrangement. Referring to FIG. 5, the nanotube morphology can be controlled by choosing an appropriate catalyst material and reaction conditions. Depending on the choice of reaction conditions, relatively large quantities (kilogram scale) of morphologically controlled CNTs substantially free of impurity related defects, such as for example, from entrapment of amorphous carbon or catalyst particles, can be obtained. The linear CNTs obtained by the methods of the present invention have diameters ranging from about 0.7 nanometers (nm) to about 200 nanometers (nm) and are comprised of a single graphene layer or a plurality of concentric graphene layers (graphitized carbon). The nanotube diameter and graphene layer arrangement may be controlled by optimization of reaction temperature during the nanotube synthesis.

Figure 6:
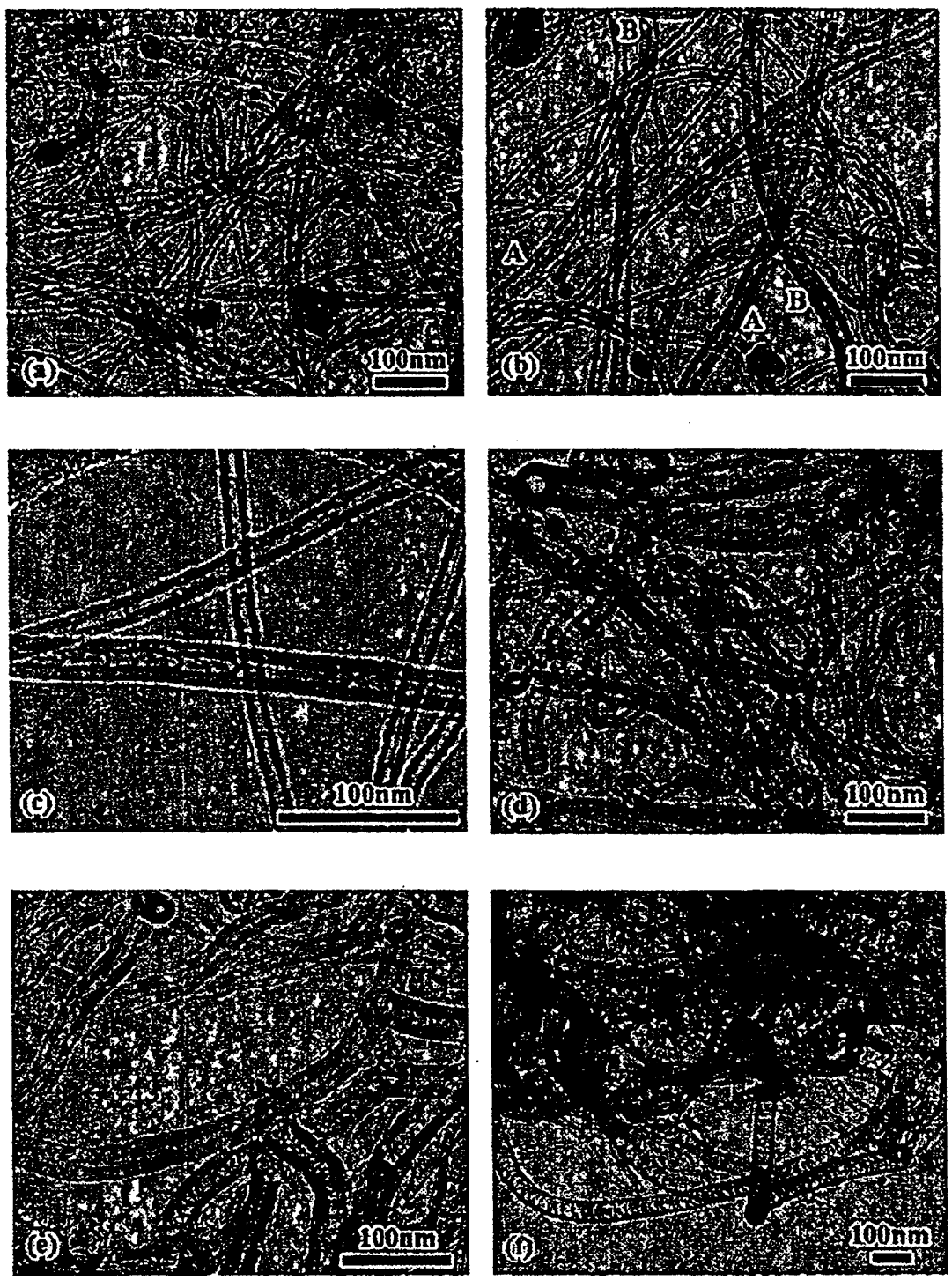
FIG. 6 shows low magnification TEM photomicrographs of CNTs grown at varying gas pressures.

FIG. 6 shows low magnification TEM images of linear CNTs grown at low, intermediate and high gas pressures. The low magnification TEM images of linear CNTs of FIG. 6 are indicative that tubule morphology can be controllably changed by choice of gas pressure "feeding" into a reactor for CNT preparation. The control of gas pressures in the methods of the present invention is accomplished by regulating gas pressure of the gases feeding in to the reactor using conventional pressure regulator devices. FIG. 6(a) shows CNTs grown at a gas pressure of about 0.6 torr. CNTs grown at a gas pressure of about 0.6 torr predominantly have a morphology that consists of a tubular configuration, completely hollow cores, small diameter, and a smooth surface. FIG. 6(b) shows CNTs grown at a gas pressure of about 50 torr. CNTs grown at a gas pressure of about 50 torr have a morphology that is essentially similar to that at about 0.6 torr, except that a small amount of tubules have an end capped conically shaped stacked configuration ("bamboo-like"). FIG. 6c shows CNTs grown at a gas pressure of about 200 torr. The CNTs grown at a gas pressure of about 200 torr have a morphology of predominantly the end-capped, conical stacked configurations ("bamboo-like") regardless of the outer diameters and wall thickness of the CNTs. As shown in FIG. 6(c), the density of the compartments within individual tubules of the CNTs is high, with inter-compartmental distance inside the "bamboo-like" structures ranging from about 25 nm to about 80 nm.

At gas pressures greater than about 200 torr, an entirely "bamboo-like" morphology is obtained for the CNTs, with increased compartmental density. The inter-compartmental distances within the individual CNTs decrease with increasing gas pressure (about 10 nm to about 50 nm at about 400 torr and about 10 nm to about 40 nm at about 600 torr and about 760 torr, respectively). As shown in FIG. 6(f), CNTs synthesized at about 760 torr have a wider tubule diameter of about 20 nm to about 55 nm. CNTs synthesized at about 760 torr have thin walls and smooth surfaces. In comparison to linear CNTs synthesized at a gas pressure of about 200 torr, CNTs synthesized at higher pressures of about 400 torr and about 600 torr are highly curved and have broken ends, as shown in FIG. 6(d) and FIG. 6(e). The highly curved and broken ends are attributed to fracturing of the CNTs during the TEM specimen preparation, which is indicative that CNTs with a "bamboo-like" morphology may be readily cleaved into shorter sections compared to the tubular type.

CNTs of the present invention have a relatively high degree of graphitization (process of forming a planar graphite structure or "graphene" layer). The complete formation of cytstalline graphene layers, and the formation of multiple concentric layers within each tubule and hollow core, with minimal defects (such as defects typically caused by entrapment of non-graphitized, amorphous carbon and metal catalyst particles) is an important prerequisite for superior mechanical properties in CNTs.

Figure 7:
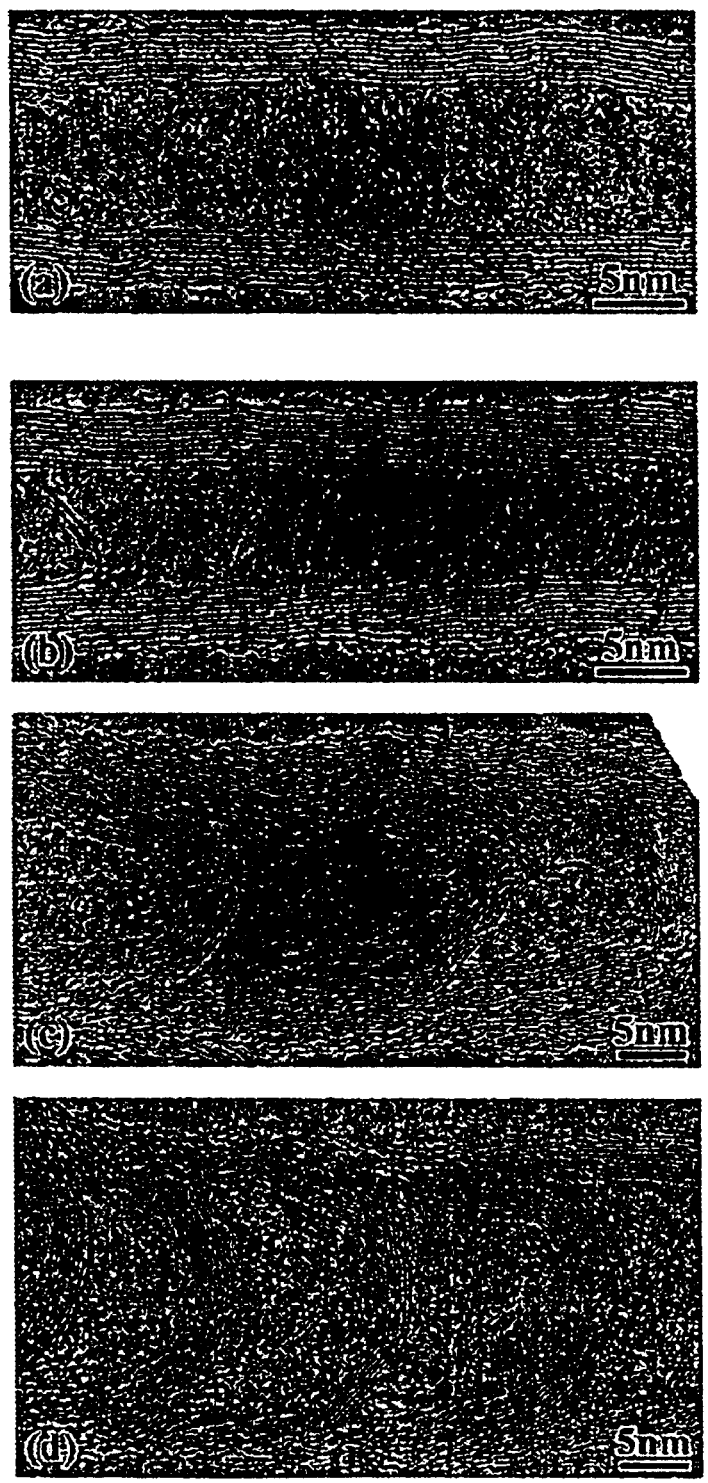
FIG. 7 shows high magnification TEM photomicrographs of CNTs grown at various gas pressures.

FIG. 7 shows TEM photomicrographs detailing morphologies of linear CNTs grown at different gas pressures.

As shown in FIG. 7, CNTs grown at pressures between about 0.6 torr to about 200 torr have good graphitization, in which the walls of the CNTs comprise about 10 graphene layers which terminate at the end of the CNT that is distal from the substrate (i.e., the fringes are parallel to the axis of the CNT), and possess completely hollow cores. Linear CNTs grown at about 200 torr have tubule walls comprising about 15 graphene layers. Individual tubules are "bamboo-like" rather than completely hollow, with diaphragms that contain a low number (less than about 5) of graphene layers. Graphene layers terminate at the surface of the CNTs, with the angle between the fringes of the wall and the axis of the CNT (the inclination angle) being about 3°, as shown in FIG. 7(b). FIG. 7(c) shows linear CNTs grown at intermediate gas pressures (about 400 torr to about 600 torr) have a "bamboo-like" structure. A "bamboo-like" structure typically has more of graphene layers in the walls and diaphragms of tubules (typically about 25 and about 10 graphene layers in the CNT walls and diaphragms, respectively), but less graphitization (lower crystallinity) due to a faster growth rate. Despite the low crystallinity, graphene layers terminate on the tubule surface with inclination angle of about 6°. As shown in FIG. 7(d), CNTs grown at about 760 torr have higher graphitization than CNTs grown at about 400 torr to about 600 torr, have a "bamboo-like" structural morphology consisting of parabolic-shaped layers stacked regularly along the symmetric axes of the CNTs. The graphene layers terminate within a short length along growth direction on the surface of the CNTs resulting in a high density of exposed edges for individual layers. As shown in FIG. 7(d), the inclination angle of the fringes on the wall of the CNTs is about 13°. The high number of terminal carbon atoms on the tubule surface is expected to impart differentiated chemical and mechanical properties in the CNTs compared the hollow, tubular type, and render the CNTs more amenable for attachment of organic molecules.

CNTs can comprise a branched ("Y-shaped") morphology, referred to herein as "branched CNTs", wherein the individual arms constituting branched tubules are either symmetrical or unsymmetrical with respect to both arm lengths and the angle between adjacent arms. In one embodiment, the Y-shaped CNTs exist as (1) a plurality of free standing, branched CNTs attached to the substrate and extending outwardly from the substrate outer surface; and (2) one or more CNTs with a branched morphology wherein the CNT tubule structures have Y-junctions with substantially straight tubular arms and substantially fixed angles between said arms.

Figure 8:
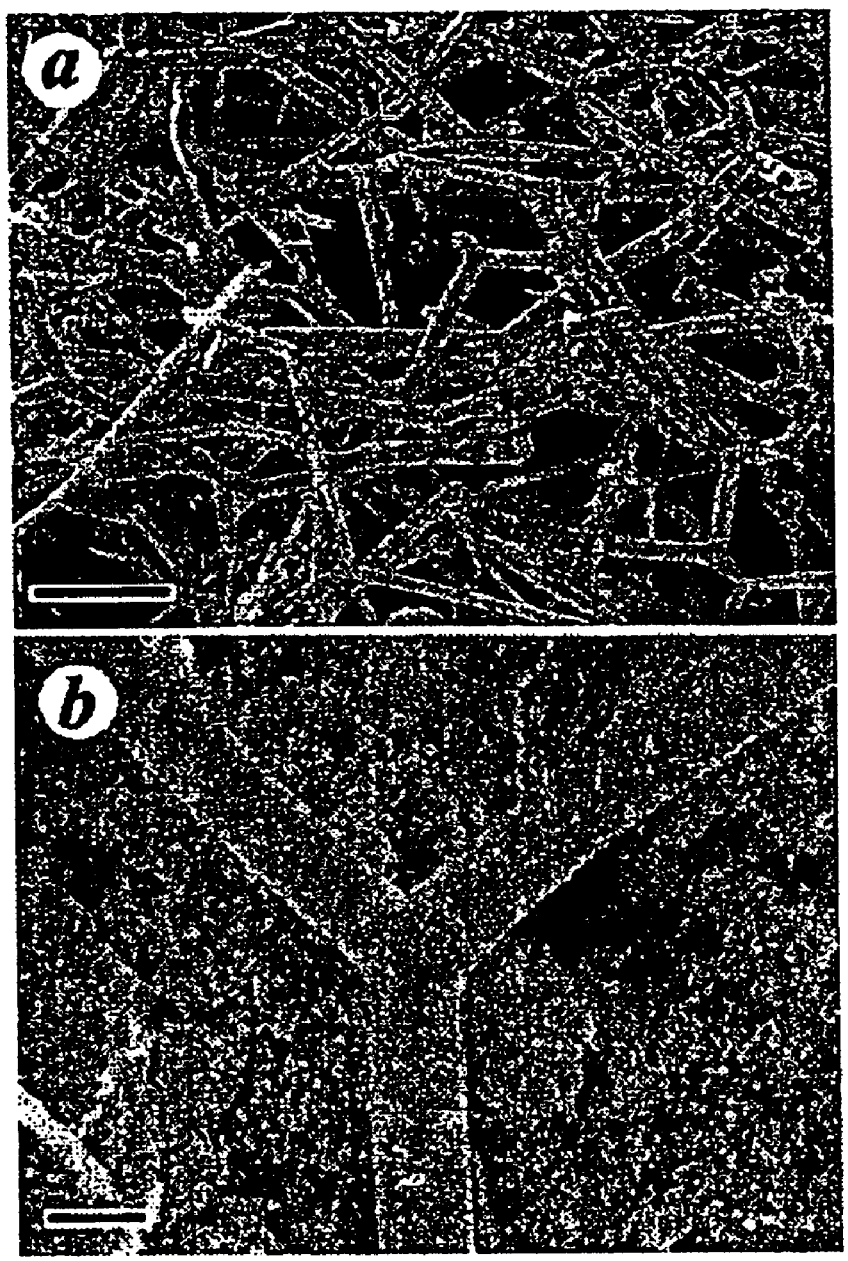
FIG. 8 shows SEM photomicrographs of symmetrically branched (Y-shaped) CNTs.

As seen in FIG. 8, branched CNTs can comprise a plurality of Y-junctions with substantially straight arms extending linearly from said junctions. The majority of branched CNTs possess Y-junctions having two long arms that are a few microns long (about 2 $\mu$m to about 10 $\mu$m), and a third arm that is shorter (about 0.01 $\mu$m to about 2 $\mu$m). CNTs with Y-junctions comprising three long arms (up to about 10 $\mu$m), and with multiple branching forming multiple Y-junctions with substantially linear, straight arms can be also obtained by the method of the invention. As shown in FIG. 8(b), a high magnification SEM micrograph shows that the branched CNTs of the invention possess Y-junctions that have a smooth surface and uniform tubule diameter about 2000 nm. The angles between adjacent arms are close to about 120°, thereby resulting in branched CNTs that have a substantially symmetric structure. Y-junctions have a substantially similar structural configuration, regardless of the varying tubule diameters of the CNTs.

Figure 9:
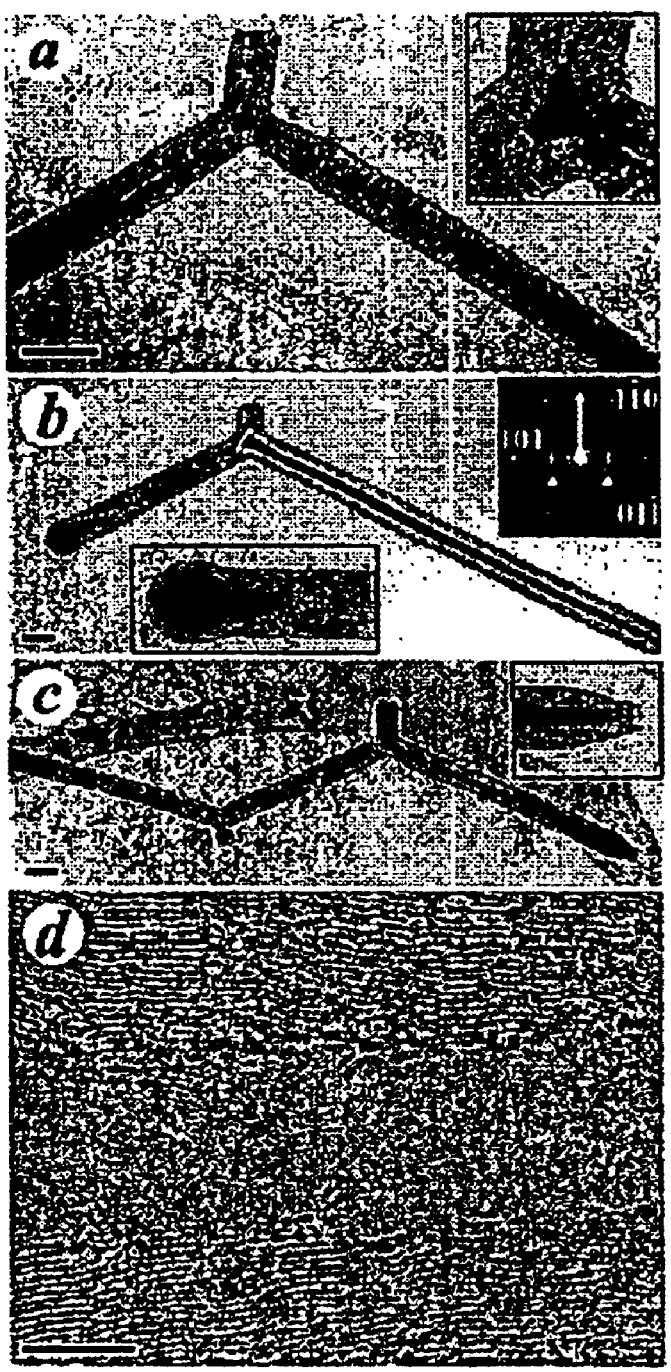
FIG. 9 shows TEM photomicrographs branched CNT Y-junctions.
Figure 10:
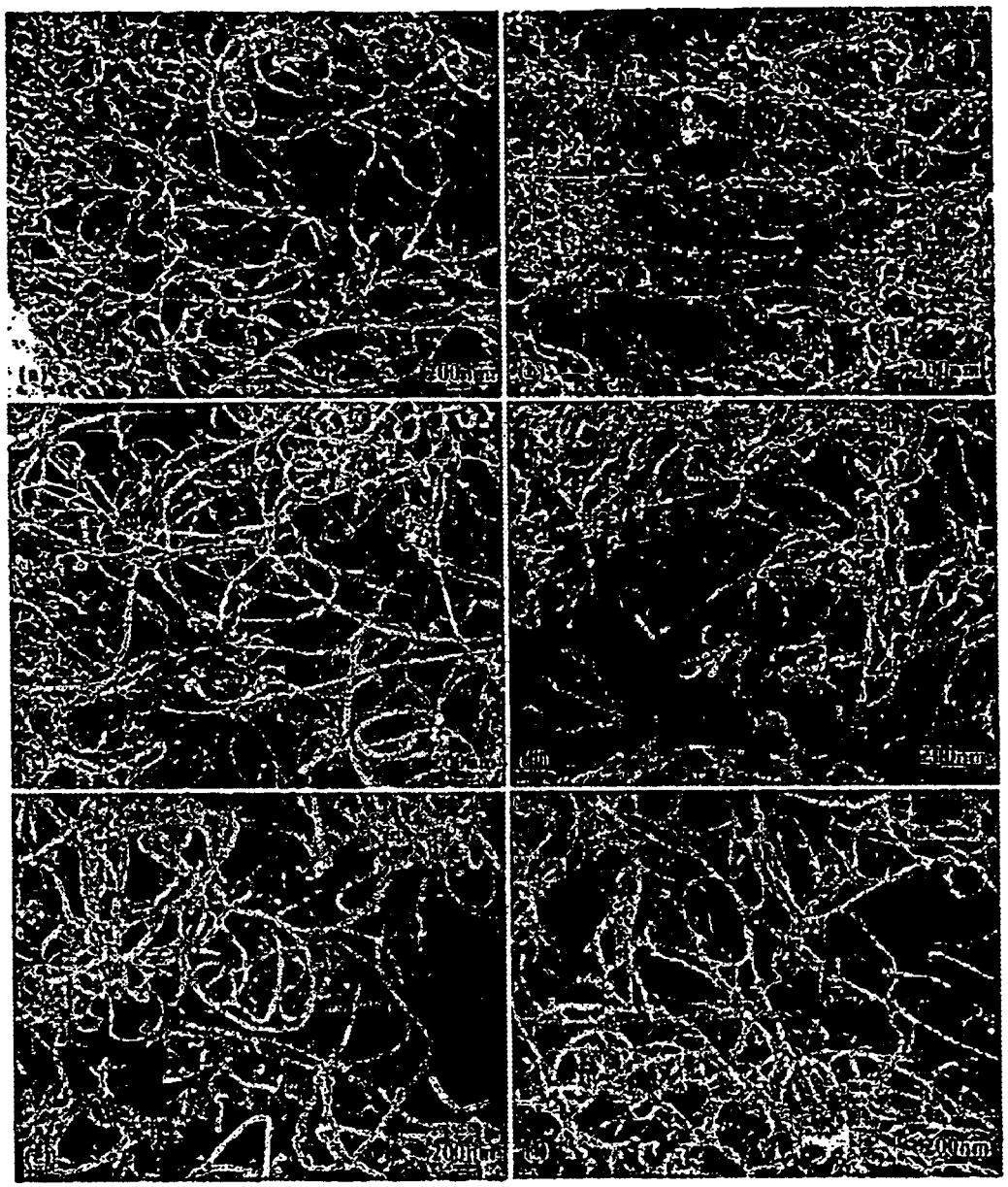
FIG. 10 shows SEM photomicrographs of CNTs grown at various gas pressures.
Figure 11:
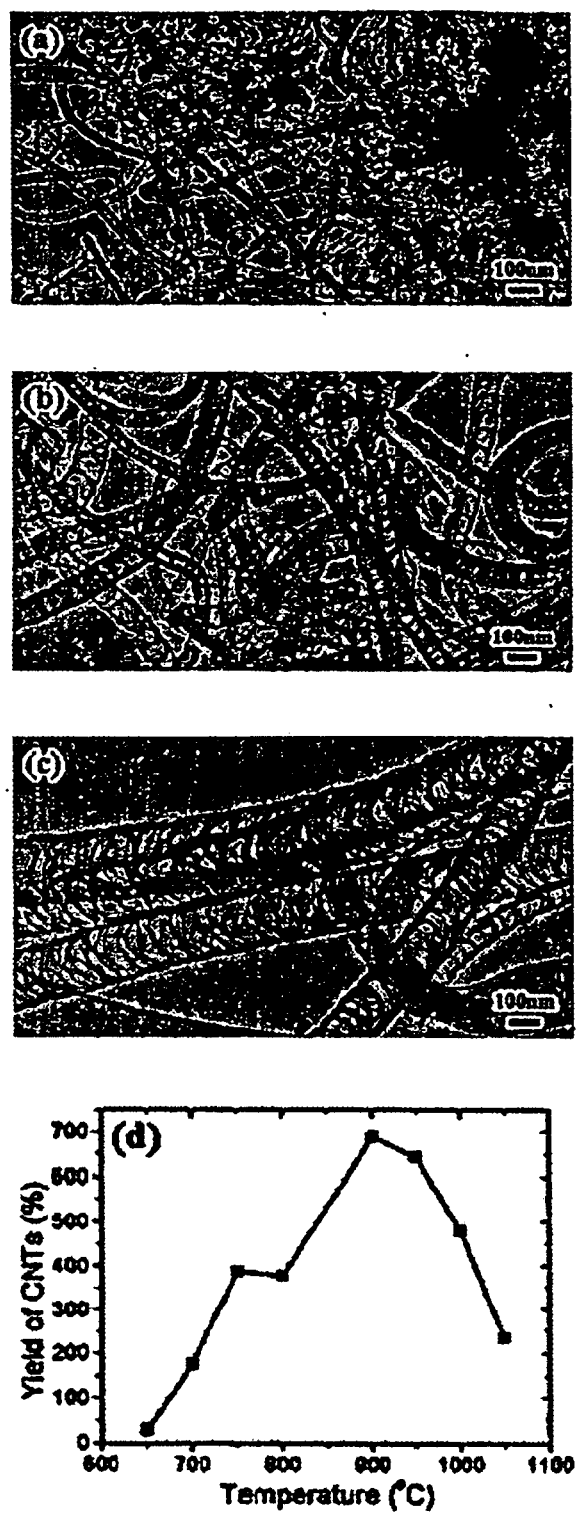
FIGS. 11(a–c) show low magnification TEM photomicrographs of "bamboo-like" CNTs synthesized at various temperatures.
Figure 12:
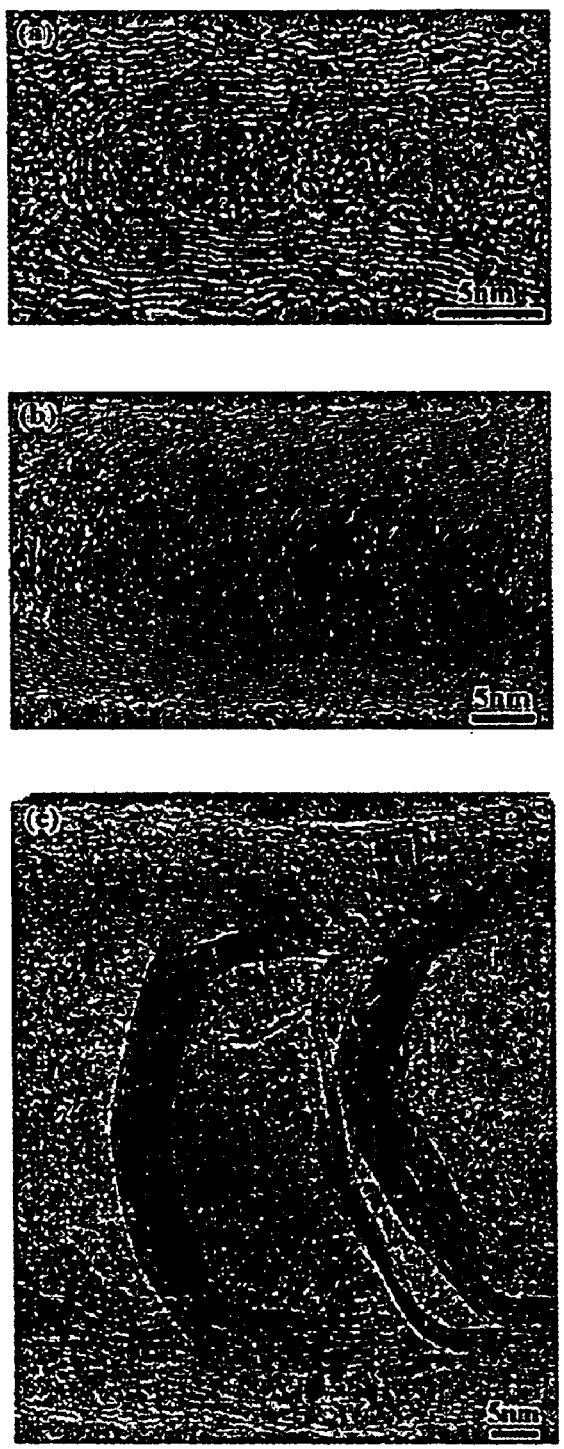
FIG. 12 shows high-resolution TEM photomicrographs of "bamboo-like" CNTs synthesized at various temperatures.
Figure 13:
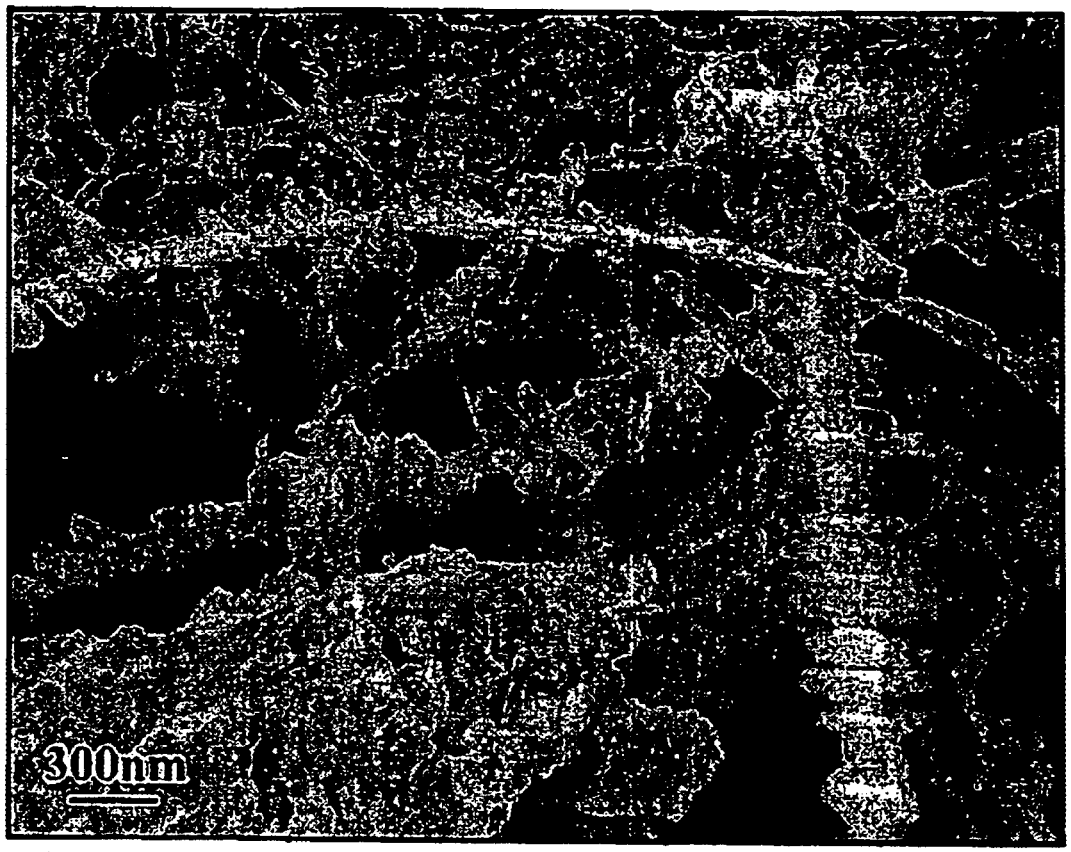
FIG. 13 is a scanning electron micrograph (SEM) image of reinforced CNT materials with surface bound Magnesium oxide (MgO) showing epitaxial growth of MgO nanostructures on CNT tubules.

As shown in FIG. 9, Y-junctions of branched CNTs have hollow cores within the tubular arms of branched CNTs. As shown in the inset of FIG. 9(a), a triangular, amorphous particle is frequently found at the center of the Y-junction. Compositional analysis by an x-ray energy dispersive spectrometer (EDS) indicates that the triangular particles consist of calcium (Ca), silicon (Si), magnesium (Mg), and oxygen (O). The calcium (Ca) and silicon (Si) are probably initially contained in the catalyst material. It is frequently observed that one of the two long arms of the Y-junction is capped with a pear-shaped particle (FIG. 9(b) and lower inset), that a similar chemical composition as that of the aforementioned triangle-shaped particle found within the tubules at the Y-junction. A trace amount of cobalt (Co) from the catalytic material is found at the surface of such pear-shaped particle. FIG. 9(b) shows that the tubule of the other long arm of the branched CNT is filled with crystalline magnesium oxide (MgO) from the catalytic material (confirmed by diffraction contrast image in the EDS spectrograph). The upper right inset in FIG. 9(b) shows selected area diffraction patterns, which indicate that one of the (110) reflections, (101), of the magnesium oxide (MgO) rod is parallel to (0002) reflection (indicated by arrow heads) from carbon nanotube walls. Therefore, the magnesium oxide (MgO) rod axis is along (210). Additionally, Y-junctions filled with continuous single crystalline magnesium oxide (MgO) from one arm, across a joint, to another arm can also be obtained. FIG. 12(c) shows a double Y-junction, wherein only one arm of the right-side Y-junction is filled with single crystal MgO. The inset of FIG. 12(b) shows a magnified image of the end of the MgO filled arm, illustrating an open tip that provides entry of MgO into the CNT Y-junctions. FIG. 12(d) shows a highly magnified partial Y-junction, which is well graphitized, and consists of about 60 concentric graphite layers (partially shown) in its tubule arms, and a hollow core with a diameter of about 8.5 nm. CNTs can comprise a plurality of free standing, linearly extending carbon nanotubes originating from and attached to the surface of a catalytic substrate having a micro-particulate, mesoporous structure with particle size ranging from about 0.1 $\mu$m to about 100 $\mu$m, and extending outwardly from the substrate outer surface. The morphology of individual CNT tubules can either be cylindrical with a hollow core, or be end-capped, stacked and conical ("bamboo-like"). Both morphological forms may be comprised of either a single layer or multiple layers of graphitized carbon. CNTs can also be separated from the catalytic substrate material and exist in a free-standing, unsupported form.

Figure 14:
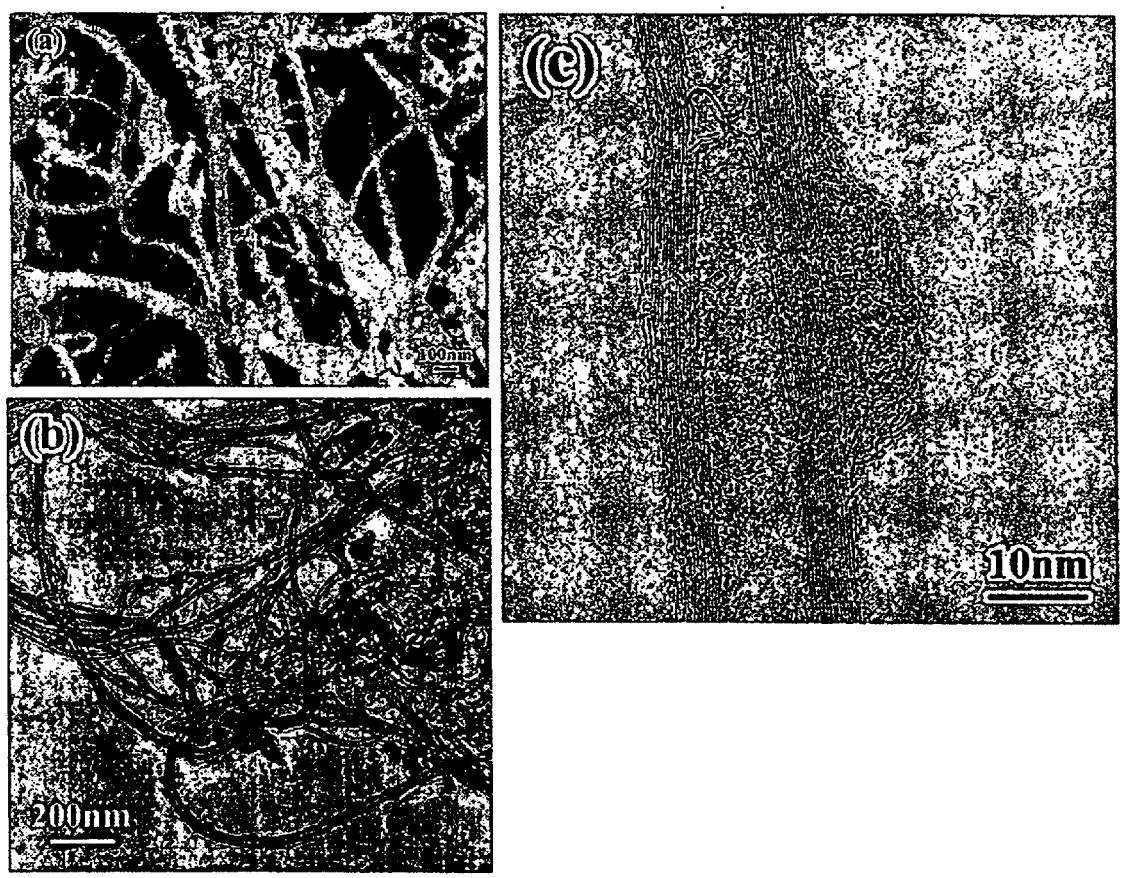
FIG. 14 shows reinforced CNT materials with surface bound amorphous boron oxide ($B_2O_3$) nanolumps on multi-walled CNT tubules.

In another embodiment of the present invention, the reinforced CNT material comprises a microparticulate oxide material that are bound substantially on the surface of the CNT tubules. The microparticulate oxide materials of the invention can be metallic or non-metallic oxides. Examples of oxide materials include, but are not limited to, magnesium oxide (MgO) and boron oxide ($B_2O_3$). As shown in FIG. 14 amorphous boron oxide ($B_2O_3$) nanolumps are formed on multi-walled CNTs. FIG. 14(a) shows a scale bar equal to 100 nanometers. FIG. 14(b) shows a scale bar equal to 200 nanometers. FIG. 14(c) shows a scale bar equal to 10 nanometers.

CNTs can be grown by any suitable method known in the art. For example, multi-wall CNTs can be grown by any CVD method, including but not limited to, plasma enhanced chemical vapor deposition (PECVE), hot filament chemical vapor deposition (HFCVD), or synchrotron radiation chemical vapor deposition (SRCVD). Suitable methods for growing CNTs are described by Li, et al., *Appl. Phys. A: Mater. Sci. Process,* 73, 259 (2001) and U.S. application Ser. No. 10/151,382, filed on May 20, 2002, the contents of both these references are hereby incorporated herein by reference in their entireties.

EXAMPLES

Example 1
Synthesis of Reinforced CNTs Having Boron Carbide ($B_xC_y$) Nanolumps Formed Substantially on the Surface of the CNTs The multi-wall CNTs were grown by catalytic chemical vapor deposition method (see Li, et al., *Appl. Phys. A: Mater. Sci. Process*, 73, 259 (2001), the contents of which is incorporated herein by reference in its entirety) and purified by hydrofluoric acid (HF). Magnesium diboride ($MgB_2$), a new superconducting material, is used as the source of boron. The synthesis of magnesium diboride ($MgB_2$) can be synthesised by combining elemental magnesium and boron in a sealed (Ta) tube in a stoichiometric ratio and sealed in a quartz ampule, placed in a box furnace at a temperature of about 950° C. for about 2 hours. Powder $MgB_2$ with average grain size of about 1 micrometer decomposes at a temperature of about 600° C. Thermally decomposed boron is more chemically reactive so the solid-state reaction can be performed at relatively low temperatures. The nanotubes were mixed gently with $MgB_2$ powder first, then wrapped by a tantalum (Ta) foil to form an assembly, and finally the assembly was placed in a ceramic tube furnace, and pumped to below about 0.5 torr by mechanical pump. The sample was heated at about 1100° C. to about 1150° C. for about 2 hours. Microstructural studies were carried out by a JEOL JSM-6340F scanning electron microscope (SEM) and JEOL 2010 transmission electron microscope (TEM), respectively. The TEM is equipped with an X-rays energy dispersive spectrometer (EDS). A TEM specimen was prepared by dispersing CNTs into an acetone solution by sonication and then putting a drop of the solution on a holey carbon grid.

Example 2
Determining the Composition of $B_xC_y$ Nanolumps

In order to find out whether the nanolumps are boron carbide, a high-resolution transmission electron microscopic (HRTEM) image of a nanolump is taken and shown in FIG. 3(*a*). The carbon nanotube nature has been preserved after the reaction. The $B_xC_y$ nanolump is crystalline. FIG. 3(*b*) is an enlarged HRTEM image of the top part of FIG. 3(*a*). FIG. 3(*c*) shows a fast-Fourier transformation (FFT) image of the HRTEM image shown in FIG. 3(*b*). The diffraction pattern obtained from FFT (FIG. 3(*c*)) is indexed as one from zone axis ($\bar{1}11$) of $B_4C$. Structure parameters of $B_4C$ for the indexing are space group R3m: (166) and lattice parameters, a=0.56 nm, c=1.21 nm. As shown in FIG. 3(*b*), the simulated HRTEM image using parameters defocus −30 nm and thickness 20 nm also matches with experimental image very well. Although no boron was detected by the EDS analysis, it is reasonable to draw a conclusion that the nanolumps are of the formula, $B_xC_y$, since both calculated HRTEM image and diffraction pattern match with experimental ones very well when using structural parameters of $B_4C$. The ratio between boron and carbon in nanolumps may differ from $B_4C$ dramatically because boron and carbon atoms can easily substitute each other. Twin boundaries were often observed in $B_4C$ nanolumps. As shown in FIG. 3(*d*), the twin boundary is along either (101) or (01$\bar{1}$) planes.

Example 3
Preparation of Catalyst Substrate for Synthesis of Linear CNTs

Mesoporous silica containing iron nanoparticles were prepared by a sol-gel process by hydrolysis of tetraethoxysilane (TEOS) in the presence of iron nitrate in aqueous solution following the method described by Li et al. (*Science*, (1996), Vol. 274, 1701–3) with the following modification. The catalyst gel was dried to remove excess water and solvents and calcined for about 10 hours at about 450° C. and about $10^{-2}$ torr to give a silica network with substantially uniform pores containing iron oxide nanoparticles that are distributed within. The catalyst gel is then ground into a fine, micro-particulate powder either mechanically using a ball mill or manually with a pestle and mortar. The ground catalyst particles provide particle sizes that range between about 0.1 μm and about 100 μm under the grinding conditions.

Example 4
Preparation of Catalyst Substrate for Synthesis of Branched CNTs

Magnesium oxide (MgO) supported cobalt (Co) catalysts were prepared by dissolving about 0.246 g of cobalt nitrate hexahydrate ($Co(NO_3)_2.6H_2O$, 98%) in 40 ml ethyl alcohol, following which immersing about 2 g of particulate MgO powder (−325 mesh) were added to the solution with sonication for about 50 minutes. The solid residue was filtered, dried and calcined at about 130° C. for about 14 hours.

Example 5
General Synthetic Procedure for Linear CNTs

The synthesis of CNTs is carried out in a quartz tube reactor of a chemical vapor deposition (CVD) apparatus. For each synthetic run, about 100 mg of the micro-particulate catalyst substrate was spread onto a molybdenum boat (about 40×100 mm²) either mechanically with a spreader or by spraying. The reactor chamber was then evacuated to about $10^{-2}$ torr, following which the temperature of the chamber was raised to about 750° C. Gaseous ammonia was introduced into the chamber at a flow rate of about 80 sccm and maintained for about 10 minutes, following which acetylene at a flow rate of about 20 sccm was introduced for initiate CNT growth. The total gas pressure within the reaction chamber was maintained at a fixed value that ranged from about 0.6 torr to about 760 torr (depending on desired morphology for the CNTs). The reaction time was maintained constant at about 2 hours for each run. The catalytic substrate containing attached CNTs were washed with hydrofluoric acid, dried and weighed prior to characterization.

Example 6
General Synthetic Procedure for Branched CNTs

The MgO supported cobalt catalyst of Example 3 were first reduced at about 1000° C. for about 1 hour in a pyrolytic chamber under a flow of a mixture hydrogen (about 40 sccm) and nitrogen (about 100 sccm) at a pressure of about 200 Torr. The nitrogen gas was subsequently replaced with methane (about 10 sccm) to initiate CNT growth. The optimum reaction time for producing branched CNTs was about 1 hour.

Example 7
Characterization of CNT Morphology and Purity by Scanning Electron Microscopy (SEM), and Tubule Structure and Diameter by Transmission Electron Microscopy (TEM)

Scanning electron microscopy (SEM) for characterization and verification of CNT morphology and purity was performed on a JEOL JSM-6340F spectrophotometer that was equipped with an energy dispersive x-ray (EDS) accessory. Standard sample preparation and analytical methods were used for the SEM characterization using a JEOL JSM-6340F microscope. SEM micrographs of appropriate magnification were obtained to verify tubule morphology, distribution and purity.

Transmission electron microscopy (TEM) to characterize individual tubule structure and diameter of the CNTs was performed on a JEOL 2010 TEM microscope. Sample specimens for TEM analysis were prepared by mild grinding the CNTs in anhydrous ethanol. A few drops of the ground suspension were placed on a micro-grid covered with a perforated carbon thin film. Analysis was carried out on a JEOL 2010 microscope. TEM micrographs of appropriate magnification were obtained for determination of tubule structure and diameter.

Example 7
Synthetic Procedure for Oxide Reinforced CNTs

Reinforced CNT materials comprising microparticulate oxide are obtained in a manner substantially similar to the procedure described in Example 1. The oxide source materials used are magnesium oxide (MgO) and boron oxide ($B_2O_3$). The microparticulate oxide formation on CNTs is carried out a pressure of 5 torr.

Although the examples described herein have been used to describe the present invention in detail, it is understood that such detail is solely for this purpose, and variations can be made therein by those skilled in the art without departing from the spirit and scope of the invention.

All patents, patent applications, and published references cited herein are hereby incorporated herein by reference in their entirety. While this invention has been particularly shown and described with references to preferred embodiments thereof, it will be understood by those skilled in the art that various changes in form and details may be made therein without departing from the scope of the invention encompassed by the appended claims.

What is claimed is:

1. A multi-walled carbon nanotube material having an outermost layer and at least one inner layer comprising a microparticulate carbide or oxide material wherein said microparticulate carbide or oxide material is bonded to the outermost layer and to at least one inner layer of said multi-walled carbon nanotube material.

2. The multi-walled carbon nanotube material of claim 1, wherein the microparticulate carbide or oxide material are carbide or oxide nanoparticles.

3. The multi-walled carbon nanotube material of claim 1, wherein the microparticulate carbide or oxide material exists substantially as carbide or oxide nanolumps on the outermost layer of the carbon nanotube material.

4. The multi-walled carbon nanotube material of claim 3, wherein the carbide or oxide nanolumps have an average diameter ranging from 10 to 200 nanometers.

5. The multi-walled carbon nanotube material of claim 3, wherein the carbide or oxide nanolumps have an average diameter of about 80 nanometers.

6. The multi-walled carbon nanotube material of claim 3, wherein the carbide or oxide nanolumps reside proximally to one another and remain bound to the outermost layer and to at least one inner layer of said multi-walled carbon nanotube material by physical or chemical bonding.

7. The multi-walled carbon nanotube material of claim 6, wherein the carbide or oxide nanolumps have an inter-particle spacing ranging from 30 to 500 nanometers.

8. The multi-walled carbon nanotube material of claim 6, wherein the carbide or oxide nanolumps have an inter-particle spacing ranging from 50 to 100 nanometers.

9. The multi-walled carbon nanotube material of claim 1, wherein the microparticulate carbide material is a metallic or a non-metallic carbide.

10. The multi-walled carbon nanotube material of claim 9, wherein the microparticulate carbide material is chosen from the group consisting of boron carbide, silicon carbide, magnesium carbide, titanium carbide, and nobium carbide.

11. The multi-walled carbon nanotube material of claim 9, wherein the microparticulate material is boron carbide.

12. The multi-walled carbon nanotube material of claim 11, wherein the boron carbide has the formula $B_xC_y$, wherein x is 4 to 50 and y is 1 to 4.

13. The multi-walled carbon nanotube material of claim 12, wherein the boron carbide ($B_xC_y$) has a stoichiometry selected from the group consisting of $B_4C$, $B_{10}C$, $B_{13}C$, $B_{12}C_3$, $B_{50}C_2$, $B_{50}C$, $B_{48}C_3$, $B_{51}C$, $B_{49}C_3$, $B_8C$, $B_{12}C$, $B_{12}C_2$ and $B_{11}C_4$.

14. The multi-walled carbon nanotube material of claim 12, wherein the boron carbide has the formula $B_4C$.

15. The multi-walled carbon nanotube material of claim 1, wherein the oxide material is a metallic or non-metallic oxide.

16. The multi-walled carbon nanotube material of claim 15, wherein the oxide material is magnesium oxide (MgO) or boron oxide ($B_2O_3$).

17. The multi-walled carbon nanotube material of claim 9 wherein a microparticulate carbide material is covalently bonded to the multi-walled carbon nanotube material.

18. The multi-walled carbon nanotube material of claim 1, wherein the microparticulate carbide material exists as a stable single phase in a homogeneity ranging from 8 to 20 atom % carbon.

19. The multi-walled carbon nanotube material of claim 1, wherein the carbon nanotubes material have a knotted rope-shaped morphology.

20. The multi-walled carbon nanotube material of claim 1, wherein the carbon nanotubes have a bone-shaped morphology.

21. A composite material comprising a multi-walled carbon nanotube material and a matrix material, said multi-walled carbon nanotube material having an outermost layer and at least one inner layer comprising a microparticulate carbide or oxide material wherein said microparticulate carbide or oxide material is bonded to the outermost layer and to at least one inner layer of said multi-walled carbon nanotube material.

22. The composite material of claim 21, wherein the microparticulate carbide material is boron carbide.

* * * * *

UNITED STATES PATENT AND TRADEMARK OFFICE
CERTIFICATE OF CORRECTION

PATENT NO. : 6,911,260 B2
DATED : June 28, 2005
INVENTOR(S) : Zhifeng et al.

It is certified that error appears in the above-identified patent and that said Letters Patent is hereby corrected as shown below:

<u>Title page,</u>
Item [75], Inventor, "Zhifen Ren", should read -- Zhifeng Ren, --.

Signed and Sealed this

Sixteenth Day of August, 2005

JON W. DUDAS
*Director of the United States Patent and Trademark Office*